United States Patent
Faivre et al.

(10) Patent No.: US 9,896,820 B2
(45) Date of Patent: Feb. 20, 2018

(54) OPERATOR ASSIST ALGORITHM FOR AN EARTH MOVING MACHINE

(71) Applicant: Caterpillar Inc., Peoria, IL (US)

(72) Inventors: Joseph L. Faivre, Edelstein, IL (US); Bradley Krone, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 43 days.

(21) Appl. No.: 15/196,092

(22) Filed: Jun. 29, 2016

(65) Prior Publication Data

US 2016/0305087 A1 Oct. 20, 2016

Related U.S. Application Data

(62) Division of application No. 14/304,550, filed on Jun. 13, 2014, now Pat. No. 9,404,237.

(51) Int. Cl.
*E02F 3/84* (2006.01)
*B62D 6/00* (2006.01)
(Continued)

(52) U.S. Cl.
CPC .............. *E02F 3/844* (2013.01); *B62D 6/002* (2013.01); *B62D 11/183* (2013.01); *E02F 3/432* (2013.01); *E02F 3/434* (2013.01); *E02F 3/436* (2013.01); *E02F 3/437* (2013.01); *E02F 9/2004* (2013.01); *E02F 9/2012* (2013.01); *E02F 9/2029* (2013.01); *E02F 9/2041* (2013.01); *E02F 9/225* (2013.01); *E02F 9/265* (2013.01); *B62D 12/00* (2013.01); *E02F 3/43* (2013.01); *E02F 3/7609* (2013.01); *E02F 3/7663* (2013.01)

(58) Field of Classification Search
CPC ....... E02F 3/844; E02F 9/2004; E02F 9/2029; E02F 9/265; E02F 9/225; E02F 9/2041; E02F 9/2012; E02F 3/434; E02F 3/437; E02F 3/436; E02F 3/432; E02F 3/7609; E02F 3/43; E02F 3/7663; B62D 6/002; B62D 11/183; B62D 12/00
See application file for complete search history.

(56) References Cited

U.S. PATENT DOCUMENTS

| 5,493,798 A | 2/1996 | Rocke et al. |
| 5,875,854 A | 3/1999 | Yamamoto et al. |

(Continued)

FOREIGN PATENT DOCUMENTS

| EP | 0990739 | 4/2000 |
| WO | 9426988 | 11/1994 |
| WO | 2009152561 | 12/2009 |

*Primary Examiner* — Jason Holloway
(74) *Attorney, Agent, or Firm* — James S. Bennin

(57) ABSTRACT

A system and method are provided for assisting a machine operator in controlling a work tool of the machine. In an embodiment, the work tool is set at a first height and the machine is travelling at a first machine speed, resulting in a first work tool or machine load. Based on these factors, a first work tool control mode or second work tool control mode is chosen. In the first work tool control mode, the work tool is manually controlled within a load limit and a work tool height limit, whereas in the second work tool control mode, the work tool load is controlled toward the first work tool load. Based on operator inputs and machine state, as well as other factors such as ground surface, the machine may switch between control modes, or out of automatic work tool control entirely.

13 Claims, 7 Drawing Sheets

(51) Int. Cl.
*E02F 9/26* (2006.01)
*E02F 9/20* (2006.01)
*E02F 9/22* (2006.01)
*B62D 11/18* (2006.01)
*E02F 3/43* (2006.01)
B62D 12/00 (2006.01)
E02F 3/76 (2006.01)

(56) References Cited

U.S. PATENT DOCUMENTS

| | | | |
|---|---|---|---|
| 6,092,013 A * | 7/2000 | Stelzle | A01B 63/1117 180/53.6 |
| 6,363,632 B1 | 4/2002 | Stentz et al. | |
| 7,630,793 B2 * | 12/2009 | Thomas | E02F 9/2029 700/275 |
| 7,869,922 B2 * | 1/2011 | Otto | A01D 41/141 56/10.2 E |
| 8,195,367 B2 * | 6/2012 | Kim | B62D 33/063 172/4.5 |
| 8,437,925 B2 * | 5/2013 | Kim | B62D 33/063 172/1 |
| 9,091,044 B2 * | 7/2015 | Choi | E02F 3/434 |
| 2008/0219820 A1 | 9/2008 | Kiegerl et al. | |
| 2008/0268927 A1 * | 10/2008 | Farley | A01D 41/1243 460/111 |
| 2009/0198382 A1 * | 8/2009 | Koch | E02F 3/432 700/275 |
| 2012/0158234 A1 | 6/2012 | Choi | |
| 2013/0251490 A1 | 9/2013 | Horii et al. | |

* cited by examiner

OPERATOR ASSIST ALGORITHM FOR AN EARTH MOVING MACHINE

RELATED APPLICATION

This application is a divisional application, pursuant to 35 U.S.C. § 121 and 37 C.F.R. 1.53(b)(1), of U.S. patent application Ser. No. 14/304,550, filed Jun. 13, 2014, which is incorporated in its entirety herein by reference.

TECHNICAL FIELD OF THE DISCLOSURE

The present disclosure relates to large machine operation assistance and, more particularly, relates to providing blade or bucket control assistance to an operator of a construction or earth moving machine such as but not limited to a track type tractor dozer.

BACKGROUND OF THE DISCLOSURE

While most earthmoving machines require the presence of a human operator, the human operator may be susceptible to pressures and failures that the machinery itself cannot experience. For example, human users can become fatigued by repetitive tasks or fine motor skill tasks of extended duration. For this reason, there have been efforts to automate certain machine functions.

With respect to the process of earthmoving, for example, U.S. Pat. No. 5,875,854 to Yamamoto et al. (Dozing System for Bulldozer) describes a system for use in a bulldozer that is said to be capable of performing an automatic dozing operation. The technique is said to automate the work cycle of digging, carrying and dumping according to various factors and inputs more specifically described in the reference. However, it appears that the '854 technique still requires significant user input and attention. For example, the system teaching control is executed by interrupting the aforementioned automated operation, and the entry of the machine into the automated mode appears to require a user decision.

While the systems, methods and techniques disclosed herein may solve or mitigate certain of the deficiencies inherent in the foregoing or other systems, it should be appreciated that the solution of any particular problem is not a limitation on the scope of this disclosure or of the attached claims except to the extent expressly noted. Moreover, this Background section is provided for reader convenience, and represents the views and interpretations of the inventors. While the listed patent document represents a known publication, the inventors' comments regarding that patent document are not prior art and do not represent a binding interpretation of prior art. The reader is referred to the patent document itself if precise information regarding the patent document is required.

SUMMARY OF THE DISCLOSRE

In accordance with one aspect of the present disclosure, a method is provided for assisting a machine operator in controlling a work tool of the machine. The method includes determining that automatic tool control is desired and determining a target machine operating state. An active operator commanded work tool motion is detected as is a last operator commanded work tool position. The machine is operating at a first machine operating state, and based on the operator commanded tool motion and the first machine operating state, a work tool control mode is selected from a first work tool control mode and a second work tool control mode. In the first work tool control mode, manual control of the work tool is maintained except that the work tool is automatically moved to adjust the machine state when an undesirable machine state is detected. In the second work tool control mode, the work tool position is adjusted to control the machine operating state toward the target machine operating state.

In another aspect of the disclosed principles, a machine is provided having an automatic blade control mode for assisting an operator of the machine. The machine includes a blade affixed to a chassis, and a blade actuator controlled by a blade controller. The blade controller is configured to determine that automatic blade control is desired, determine a target operating state, detect that the operator has commanded the blade to a first position and that the machine has a first machine operating state, resulting in a blade load corresponding to a first blade load, and based on the detected first height and first machine operating state, select one of a first blade control mode and a second blade control mode. In the first blade control mode, the blade is manually controlled within a load limit except that the blade is automatically moved to adjust the machine operating state when an undesirable machine operating state is detected. In the second blade control mode, the blade load is controlled toward the target operating state.

In yet another aspect of the disclosed principles, a machine work tool control system is provided including a number of elements. These include an operating point determiner configured to determine a target operating state of the machine based on machine data to determine a work tool operating point and an operating point adjuster configured to modify the determined work tool operating point to produce a modified work tool operating point based on operator input. A controller mode determiner is included and is configured to analyze machine data and operator input and provide a controller mode indicator that indicates which one of a first work tool control mode and a second work tool control mode is to be used. A work tool load controller is configured to generate machine commands for work tool control assistance based on the modified work tool operating point, the controller mode indicator, the work tool floor value and the machine data.

Additional and alternative feature and aspects of the disclosed methods and systems will become apparent from reading the detailed specification in conjunction with the included drawing figures.

DETAILED DESCRIPTION OF THE DISCLOSURE

Figure 1:
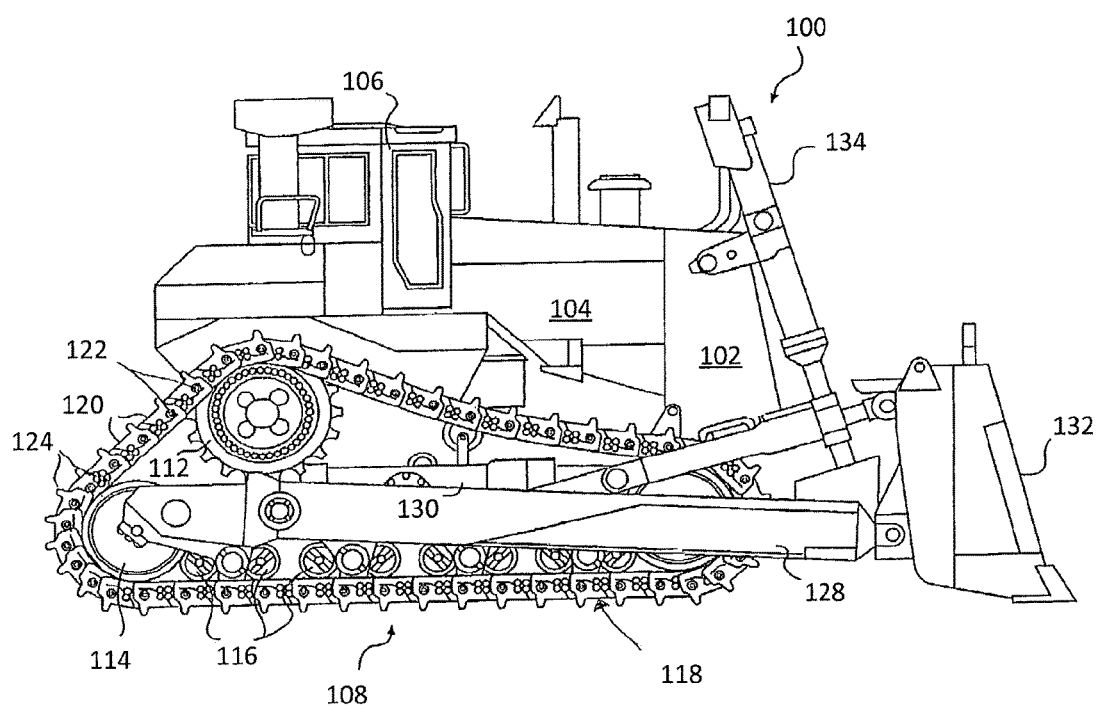
FIG. 1 is a side elevational view of an example earthmoving machine within which embodiments of the disclosed principles may be implemented.

As noted above, the disclosed principles are applicable to a variety of earthmoving machines, e.g., dozers, excavators, motorgraders and so on. In the given illustrations, the Track type tractor dozer will be used as an example. As noted above, dozing with a track type tractor is a frequently-used operation for performing earth moving and shaping tasks. Many track type tractor applications can be categorized as either light dozing or heavy dozing. Example applications that could be categorized as light dozing include, but are not limited to grading, clean-up work and material spreading. Example applications that could be categorized as heavy dozing include, but are not limited to slot dozing, stockpiling or bulk earth-moving. In general, the object in heavy dozing is to move as much material as possible is as little time as possible. In light dozing the object is to perform finer shaping or cleaning, e.g., to maintain a desired grade or smooth a work area. With respect to light dozing, it is not desired to maintain a maximum blade load.

Before going too far, it may be instructive to further discuss the term "blade load" or "tool load" as used herein. Unless the context suggests otherwise, these terms are used to denote the reactive load imposed against the machine, its ground engaging element, or its driveline components due to the positioning of the blade or other tool. Thus, for example, the blade load may actually appear and be measured as drawbar pull in a track type tractor. Drawbar pull as used herein refers to the force delivered to the tracks of the track type tractor. This force may be expended primarily by moving the tractor, e.g., pushing a load, and by moving material under the track in the form of track slip. Other forces may be expended via frictional losses and may be accounted for in drawbar pull. Similarly, the terms "machine load" and "driveline torque" as used herein also denote the reactive load imposed by the blade or other tool.

Within a larger job, there may be both heavy and light dozing tasks at different portions of a cycle. For example, within a slot dozing or bulk earth moving application, it may be desired to first acquire as large of a load as possible, move the acquired material to another location, then spread the material over an area. During the load acquisition mode, it will typically be desired to run the machine at the most efficient operating point with respect to material movement. During the carry and spread portions of the cycle, it will typically be desired to maintain a smooth floor.

The described system and technique monitor operator commands such as blade position (e.g., blade lift/lower), machine gear, engine throttle setting, machine steering, and so on, and use the monitored data to determine whether the operator intends to operate in a light dozing mode or a heavy dozing mode and accordingly automatically sets an operating mode. The system then uses a desired operating point, calculated from stored data or cycle properties and material properties, to assist the operator to control the machine by adjusting the blade position.

While in the light dozing mode, the system performs a load protection or load limiting function. In particular, in this mode, the operator controls the machine manually but the system automatically raises the blade if the operator is not controlling blade motion and the load becomes too high. The system automatically lowers the blade as the load decreases if the operator is not controlling blade motion. However, the system will be prevented from lowering below its previous position (without going below a "blade floor"). In an embodiment, the operator may override the automatic blade control via manual blade control inputs. In a further embodiment, as the blade load increases and nears the desired operating point, any operator commands are attenuated to allow finer control near the desired operating point and to allow a smoother transition to the steady-state target operating point.

As the phrase is used herein, the "blade floor" refers to the position to which the operator last manually commanded the blade. This position is used as a reference point below which the automatics will not command in the first blade control mode (light dozing mode). Blade height can be defined in one of several ways. For example, blade height may be measured as the height of the blade cutting edge with respect to the machine frame origin. Alternatively, blade height may be measured as the height of the blade cutting edge with respect to the pitched machine frame origin. This method accounts for machine chassis pitch. In other words, if the machine is transitioning from a given slope to a steeper slope, the blade floor will remain constant but the blade height calculation will indicate a greater value. This will allow the controller to lower the blade, even though no change in lift cylinder extension was made.

While in the heavy dozing mode, the system assists the operator in maintaining a desired operating point, e.g., an operating point that yields maximum productivity. In this mode, the operator generally desires to maintain a given load and gives manual commands to make minor blade height adjustment only when needed to compensate for terrain deviations or slope transitions; to assist the operator, the system automatically raises and lowers the blade to maintain the desired load.

In an embodiment, as the machine transitions into the heavy dozing mode from the light dozing mode, the manual lower command may be inhibited and overridden by the automatic system. If the operator desires to override the system, the inhibition can be removed by placing the command lever in the neutral or raise position for example, or by providing a very large blade lower command. After deactivating the inhibition, the operator will be able to override automatic adjustments with manual commands.

Given this overview, the reader may more easily understand the details of the disclosed principles. Before discussing details and features that are specific to the disclosed embodiments and principles, an example environment will be discussed for the sake of context. In this regard, FIG. 1 is a side elevational view of an example earthmoving machine within which embodiments of the disclosed principles may be implemented. As noted above, the described principles also find beneficial application with respect to other machine types as well.

The illustrated track type tractor 100 includes a main frame 102 to which a power source 104 is mounted. The power source 104 may be any suitable type of engine such as a diesel-type internal combustion engine, a gasoline-type internal combustion engine, a natural gas engine, a gas turbine engine, an electric or hydraulic motor, and so on. An operator cab 106 is also provided atop the main frame 102.

Below the main frame 102 is an undercarriage 108 positioned for propelling the tractor 100. The undercarriage 108 may be operatively coupled to the power source 104 by a mechanical link (not visible) such as one or more of a transmission, gear assembly, differential steering unit or the like. Regarding the undercarriage 108, it may include a drive sprocket 112, a pair of idler wheels 114, and a plurality of mid-rollers 116. An endless ground-engaging track 118 is trained around the drive sprocket 112, idler wheels 114, and mid-rollers 116. The ground-engaging track 118 may include a plurality of shoes 120 hinged together by pins 122. Each shoe 120 may include a grouser 124 for direct engagement into a surface underlying the tractor 100.

In the illustrated bulldozer configuration depicted in FIG. 1, the tractor 100 includes a pair of push arms 128 extending from a roller frame 130 and coupled to a blade 132. In order to lift, tilt, and lower the blade 132, one or more hydraulic cylinders 134 may be connected to the blade 132 and the tractor 100. The hydraulic cylinders 134 may be powered by a hydraulic system 126 of the tractor 100 under the control of a blade position control solenoid valves as will be discussed in greater detail below. The hydraulic system 136 of the tractor 100 may include a pump powered by the power source 104 as well as suitable gauges, tanks and valves to provide a source of pressurized hydraulic fluid and to act as a sink for used hydraulic fluid, e.g., fluid exiting from hydraulic cylinders 134 during blade lowering.

As noted above, the hydraulic cylinders 134 responsible for raising and lowering the blade 132 may be controlled via one or more solenoid valves, which are electrically-controlled valves for allowing or disallowing the passage of high-pressure hydraulic fluid. The solenoid valves themselves are controlled, in an embodiment, by a blade controller which, in an embodiment, is executed as a function within another controller serving a more general purpose. Alternatively, the blade controller may be executed as a dedicated special function controller.

To facilitate the positioning and monitoring functions of the blade control system, as well as other ordinary functions of the machine, the tractor 100 may include a number of sensors including a blade height sensor, a machine ground speed sensor, a track speed sensor, a tilt sensor, a transmission sensor, an engine speed sensor, and so on.

Figure 2:
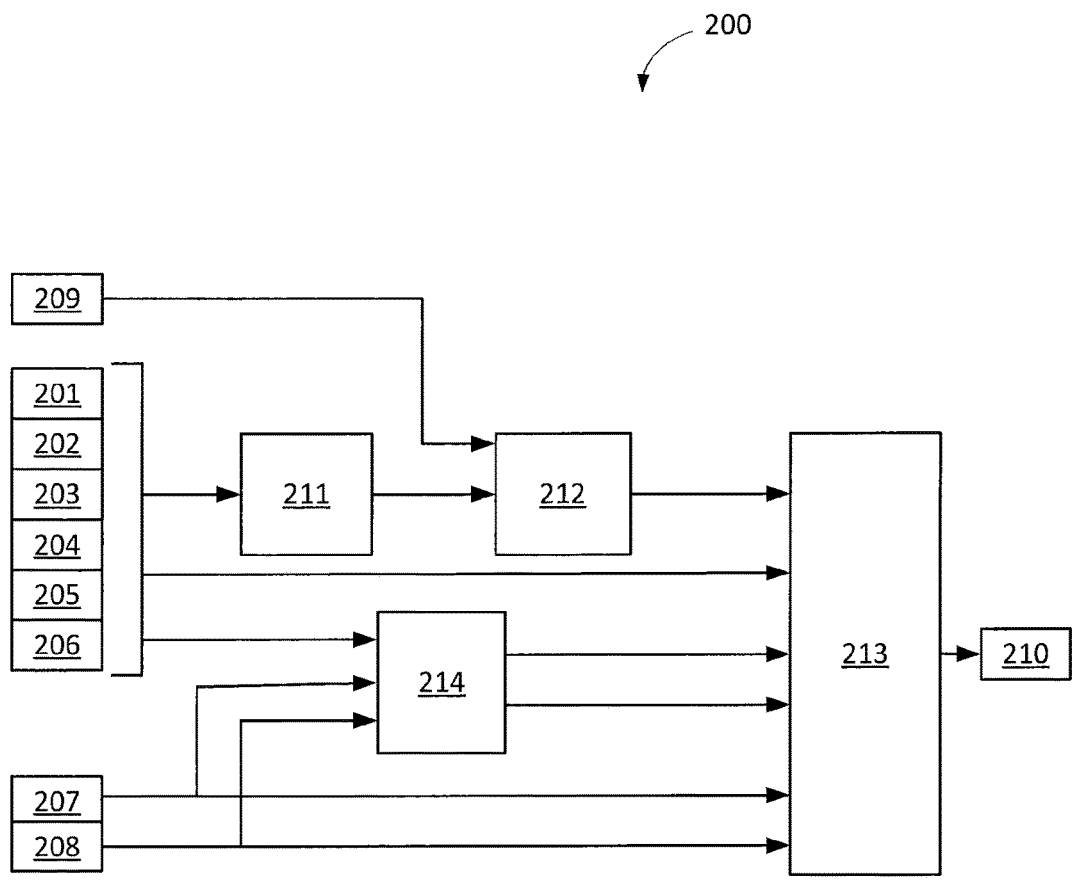
FIG. 2 is a controller architectural schematic showing a controller layout including functional modules, inputs and outputs in accordance with an embodiment of the disclosed principles.

The controller architectural schematic of FIG. 2 shows an example of a controller architecture 200 including functional modules, inputs and outputs in an embodiment. In the illustrated example, the received inputs include machine ground speed 201, track speed 202, sprocket torque 203, machine pitch 204, engine speed 205 and gear 206. Additionally, the a controller architecture 200 receives an indication of blade height 207, operator blade lift command 208, and operating point adjustment 209 from the operator. The illustrated controller architecture 200 processes the received inputs (and/or derivative values) to produce machine commands 210 for providing blade control assistance.

At the outset, an operating point determiner 211 processes the machine ground speed 201, track speed 202, sprocket torque 203, machine pitch 204, engine speed 205 and gear 206 to determine a machine state and to derive an optimum operating point. It will be appreciated that the term optimal when used herein refers, unless otherwise specified, to a state that substantially maximizes or increases one or more desirable values without necessarily maximizing all desirable values or minimizing all undesirable values. In this example, the operating point is a point defined by certain machine operating parameters or conditions such as machine ground speed, blade load, track slip, gear, and so on.

The determined optimal operating point is passed to an operating point adjuster 212, along with any operating point adjustment 209 from the operator. The operating point adjuster 212 generates a desired operating point based on these inputs, and the desired operating point is in turn provided as an input to a blade load controller 213 that is responsible for generating the machine commands 210 for providing blade control assistance. The blade load controller 213 also takes a number of other inputs in order to generate the machine commands 210 in the illustrated example. The blade load controller 213 employs a closed loop controller in an embodiment, as will be appreciated from the more detailed discussion to follow, to maintain the desired machine operating point. The closed loop controller may be a multi-loop controller with ground speed, driveline torque, track slip and blade height driving the various stages of the controller.

Thus, referring back to the inputs, the machine ground speed 201, track speed 202, sprocket torque 203, machine pitch 204, engine speed 205 and gear 206, as well as the indication of blade height 207 and operator blade lift command 208 are received by a controller mode determiner 214. The controller mode determiner 214 outputs a controller mode indicator and a blade floor value, both of which are provided to the blade load controller 213.

Finally, the blade load controller 213 also receives the raw machine ground speed 201, track speed 202, sprocket torque 203, machine pitch 204, engine speed 205 and gear 206, as well as the indication of blade height 207 and operator blade lift command 208. As noted above, the output of the blade load controller 213 is a set of machine commands 210 to control the machine blade in one of multiple control modes.

Discussing the functional modules more specifically, the operating point determiner 211 monitors the machine ground speed 201, track speed 202, sprocket torque 203, machine pitch 204, engine speed 205 and gear 206 and estimates material properties (e.g., coefficient of traction and shear modulus) and cycle properties (e.g., slope and cycle distance). Using this information, the system predicts the operating point that will substantially maximize a machine performance value (e.g., productivity, cycle time, fuel efficiency, etc.). The optimum operating point that is output by the operating point determiner 211 may be, for example, as simple as a target machine ground speed that correlates to a target blade load at a given throttle setting.

Under certain circumstances, an operator may elect not to run the machine at the recommended operating point determined by the operating point determiner 211. To accommodate such circumstances, the ability to adjust the desired operating point is provided to the operator via a user interface such as a GUI (graphical user interface). For example, where the optimum operating point is a target ground speed, the operator may set a desired ground speed offset (or another factor such as a normalized parameter that correlates to a ground speed offset). This offset would allow the operator to force the system to maintain a heavier or lighter load as needed while still allowing the system to adjust for variations in material and slope.

Referring to the controller mode determiner 214, this module determines if the operator is running in a light mode or heavy mode. These modes will be discussed in greater detail later herein. The controller mode determiner 214 also determines the blade floor parameter, which will be discussed in greater detail below.

Figure 3:
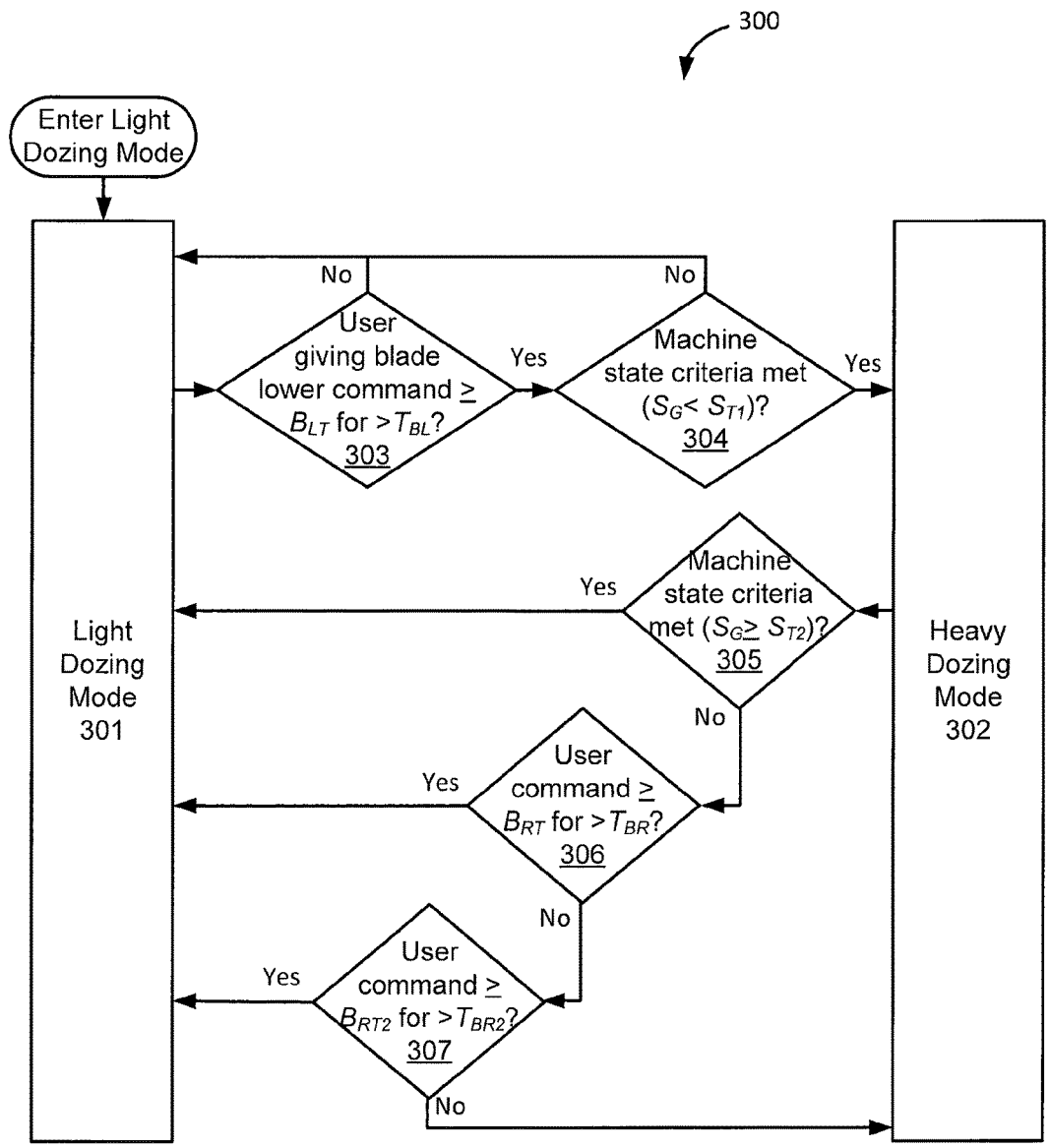
FIG. 3 is a simplified state diagram showing a mode selection process in accordance with various embodiments of the disclosed principles.

An example of a mode determination process employed by the controller mode determiner 214 is summarized by the process 300 shown in FIG. 3. The illustrated process 300 is a state process flow, wherein transitions between stable states (a light dozing mode 301 and a heavy dozing mode 302) are driven by a series of decisions tied to machine state and operator inputs.

In particular, from the light dozing mode 301, the controller determines at decision 303 whether the operator has been giving a blade lower command of greater than a predetermined lowering threshold $B_{LT}$ for longer than a predetermined period $T_{BL}$. If not, the controller remains in the light dozing mode 301. Otherwise, the process continues to decision 304, wherein the controller determines whether defined machine state criteria are met, e.g., in an embodiment, whether the machine ground speed $S_G$ is less than a predetermined speed threshold $S_{T1}$. If the criteria are met, the controller shifts to the heavy dozing mode 302, whereas if the criteria are not met, the controller remains in the light dozing mode 301.

When in the heavy dozing mode 302, the controller determines via various decisions based on operator inputs and machine state, whether to transition to the light dozing mode 301 or to remain in the heavy dozing mode 302. In particular, at decision 305, the controller determines, as in decision 304, whether defined machine state criteria are met, e.g., in an embodiment, whether the machine ground speed $S_G$ is greater than or equal to a predetermined speed threshold $S_{T2}$. This speed threshold $S_{T2}$ may be the same as or different than the speed threshold $S_{T1}$ applied in decision 304. If the criteria are met, the controller shifts to the light dozing mode 301, whereas if the criteria are not met, the controller moves to decision 306.

At decision 306, the controller determines whether the operator has been giving a blade raise command of greater than a predetermined raise threshold $B_{RT}$ for longer than a predetermined period $T_{BR}$. If so, the controller transitions to the light dozing mode 301. Otherwise, the controller either remains in the heavy dozing mode 302 or optionally continues to decision 307 in an embodiment wherein multiple raise command thresholds are applied. In this embodiment, the controller determines at decision 307 whether the operator has been giving a blade raise command of greater than a second predetermined raise threshold $B_{RT2}$ for longer than a second predetermined period $T_{BR2}$. If so, the controller transitions to the light dozing mode 301, and otherwise the controller remains in the heavy dozing mode 302.

Figure 4:
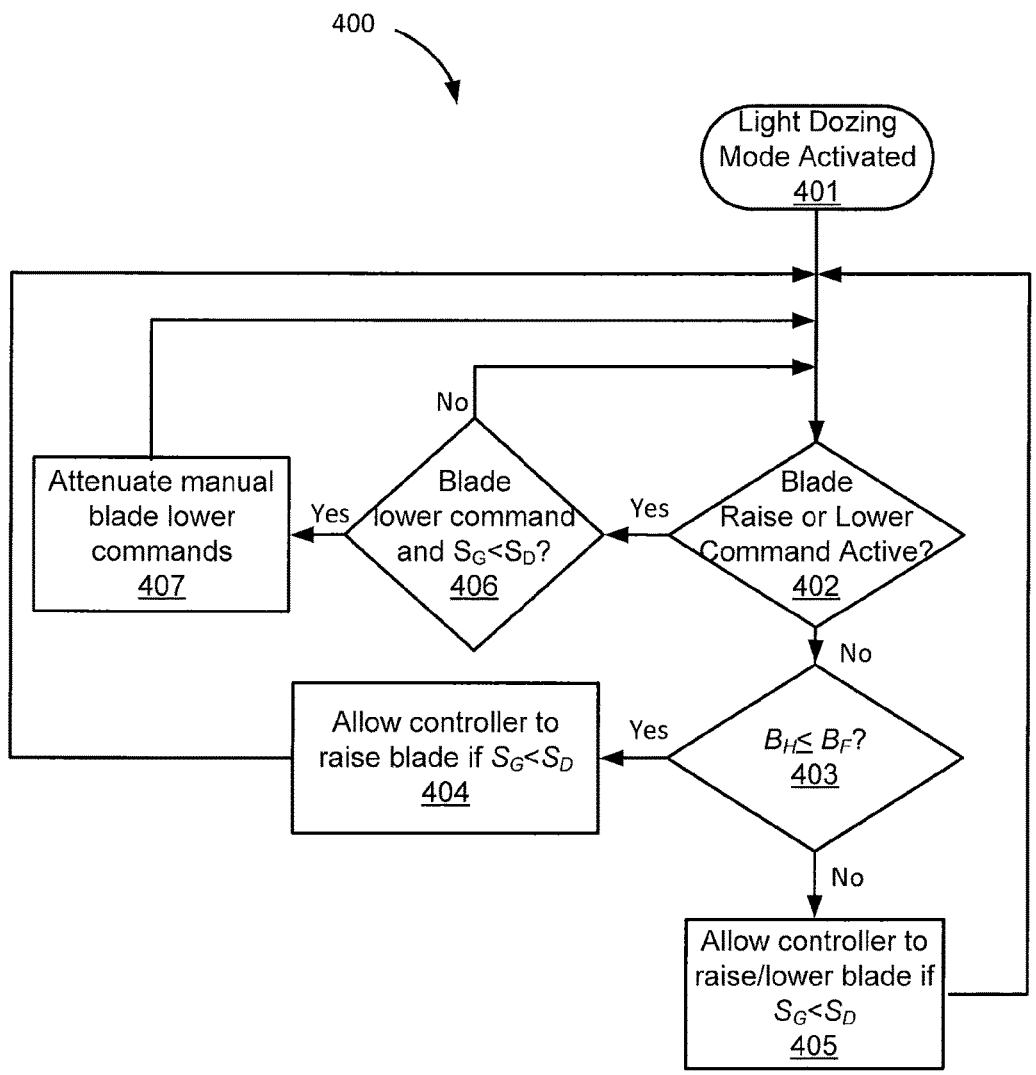
FIG. 4 is a flow chart showing an exemplary process of blade control within a light dozing mode in accordance with an embodiment of the disclosed principles.

As shown in FIG. 4, when the controller is in the light dozing mode 301, the behavior of the controller is configured primarily to limit the machine load. In other words, one result of the light dozing mode is to act as a load protection or load limiting feature. In this mode the operator controls the machine manually for the majority of the time and the controller raises the blade 132 if the load becomes too high. The system automatically lowers the blade as the load decreases if the operator is not controlling blade motion, but will not lower the blade past the previous operator commanded position. The operator may override the automatic control with manual commands. Further, as the load increases and nears the desired operating point, the operator's commands are attenuated by the controller to allow finer control near the desired operating point and to allow a smoother transition to the steady-state target operating point.

The blade floor is defined as the position to which the operator last manually commanded the blade 132, e.g., via a joystick command. This position is used as a reference point to set a blade height 207 below which the controller will not command. The manner of defining blade height 207 is not critical and any suitable protocol may be used, e.g., the height of the blade cutting edge with respect to the machine frame origin or the height of the blade cutting edge with respect to the pitched machine frame origin.

The latter protocol accounts for machine chassis pitch. In other words, if the machine is transitioning from a given slope to a steeper slope, the blade floor will remain constant but the blade height calculation will indicate a greater value. This will allow the controller to lower the blade 132, even though no change in lift cylinder extension was made. Thus, although either protocol is usable, one benefit of the latter over the former is that it allows the machine to actively reject variations in terrain elevation, resulting in a smoother profile.

When the light dozing mode 301 is activated at stage 401 of the process 400, the controller flows through a series of control decisions, independent from the mode determination decisions discussed above with respect to FIG. 3. In particular, at stage 402 of the process 400, the controller determines whether the operator is giving a blade raise or lower command. If it is determined that the operator is giving neither a blade raise nor blade lower command, the process 400 flows to stage 403, wherein the controller determines whether the present blade height $B_H$ is less than or equal to the blade floor $B_F$.

If the present blade height is less than or equal to the blade floor, the controller allows the blade load controller to raise the blade at stage 404 as long as certain machine state criteria are met, e.g., machine ground speed $S_G$ is less than a desired machine ground speed $S_D$. If the present blade height $B_H$ is not less than or equal to the blade floor $B_F$, then the controller at stage 405 allows the blade load controller to raise or lower the blade as long as the machine state criteria are met.

If at stage 402, the controller instead determines that the operator is giving a blade raise or lower command, the process 400 flows to stage 406, wherein the controller determines whether the command is a blade lower command and the machine state criteria are met. If so, then at stage 407, the controller attenuates the operator's blade lower command based on the blade state, e.g., decreasing responsiveness as the difference between the blade load and the desired blade load (or ground speed and the desired ground speed) decreases.

Figure 5:
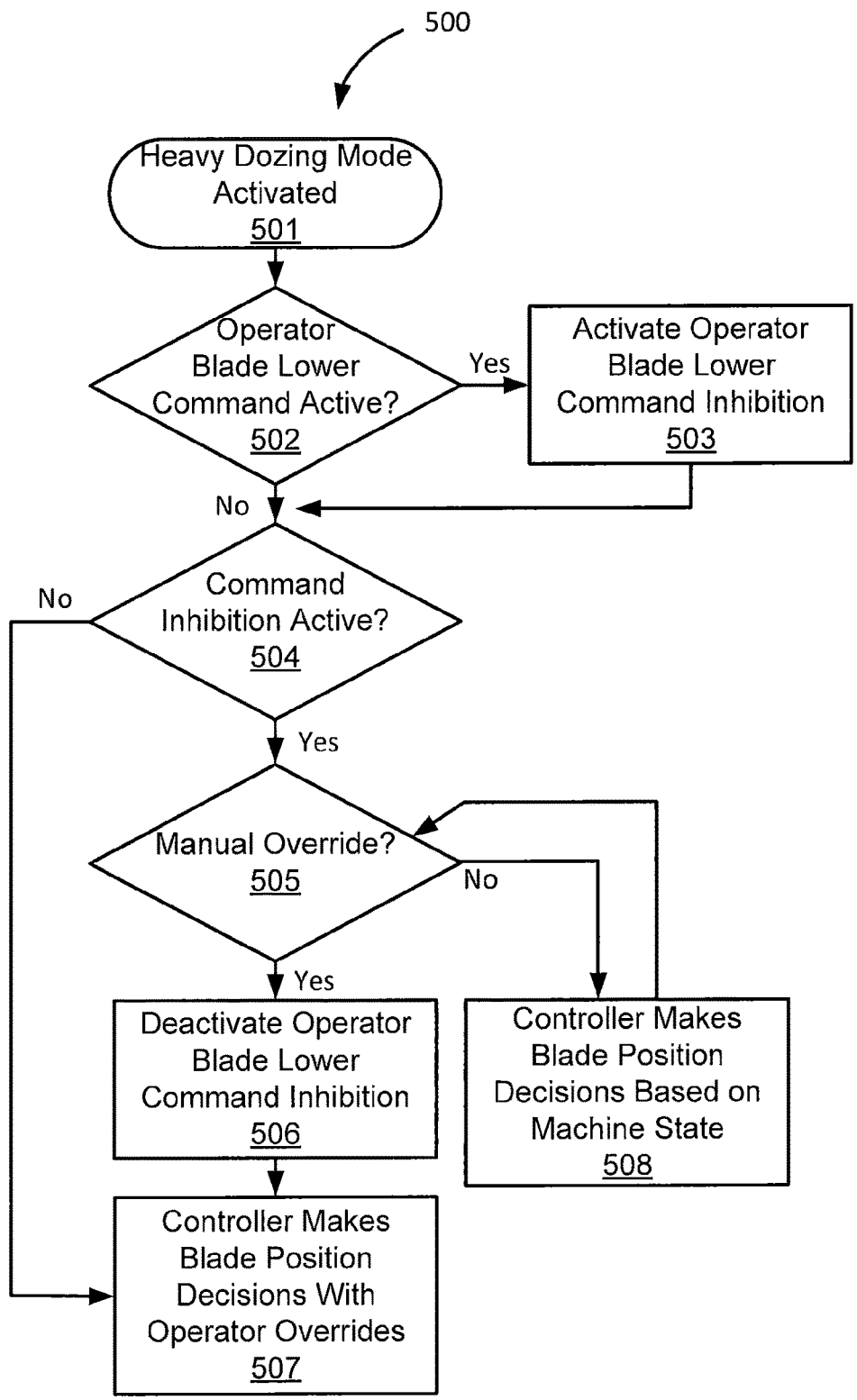
FIG. 5 is a flow chart showing an exemplary process of blade control within a heavy dozing mode in accordance with an embodiment of the disclosed principles.
Figure 6:
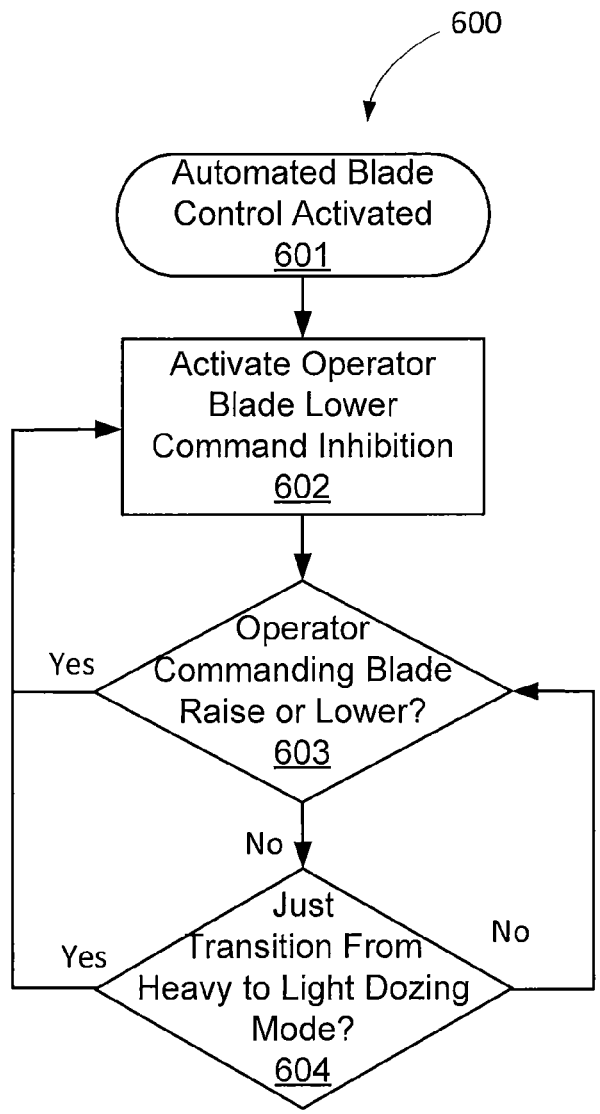
FIG. 6 is a flow chart showing an exemplary process of setting a blade floor value in accordance with an embodiment of the disclosed principles.

As seen above with reference FIG. 3, the controller may provide blade control assistance in either the light dozing mode or the heavy dozing mode. While FIG. 4 has described the controller behavior while in the light dozing mode, the behavior of the controller while in the heavy dozing mode is shown in FIG. 5.

The controller is configured in the heavy dozing mode to assist the operator in maintaining a desired operating point, such as the operating point that allows for maximum productivity based on one or more parameters of interest. In an embodiment, this configuration has a goal of maintaining a given load with the operator presumably providing manual commands only to make minor blade height adjustment to compensate for terrain deviations or slope transitions while the controller raises and lowers the blade to maintain the desired load.

As the controller transitions into the heavy dozing mode from the light dozing mode, any active manual lower command will be inhibited and overridden by the controller. If the operator desires to override the controller, the inhibit can be removed in an embodiment by placing the command lever in the neutral or raise position, or by providing a very large blade lower command. In this embodiment, once the operator inhibit is deactivated, the operator may override the controller with manual commands.

Once the heavy doze mode is activated as in stage 501 of the illustrated process 500, the controller determines at stage 502 whether there is an active operator blade lower command. If there is such a command, it is inhibited at stage 503 and the process 500 continues to stage 504. The controller determines at stage 504 whether the blade lower command inhibition is active, and if so, at stage 505 the controller determines whether the operator is providing inputs that would warrant overriding the operator control inhibition. For example, the operator may input a blade raise command or a large (greater than a certain raise threshold) lower command.

If the operator has provided inputs that warrant overriding the operator control inhibition, then the controller deactivates the inhibition of operator blade lowering commands at stage 506 to allow operator blade control at stage 507. Otherwise, the inhibition remains active and the controller makes all blade raising and lowering decisions based on machine state at stage 508. For example, the controller may raise the blade if the machine ground speed is less than a desired ground speed and lower the blade if the machine ground speed is greater than the desired ground speed.

As discussed above, the controller establishes a blade floor value $B_f$ as a reference for use in controlling the blade height during certain automated operations. While those of skill in the art will appreciate other methods of setting the blade floor $B_f$ based on the following example, this example is provided to guide the reader as to at least one suitable method.

The blade floor setting process 600 may begin when the machine starts if automated blade control is always active or otherwise when the feature is activated, as in stage 601. At stage 602, the controller sets the blade floor $B_f$ at the current measured blade height $B_H$. As noted above, the blade height $B_H$ can be measured in any suitable fashion, e.g., $B_H$ may be measured as the height of the blade cutting edge with respect to the machine frame origin or as the height of the blade cutting edge with respect to the pitched machine frame origin.

At stage 603 of the process 600, the controller determines whether the operator is manually commanding a blade raising or lowering. If it is determined that the operator is commanding a blade raising or lowering, then the controller returns to stage 602 of the process 600 where the blade floor $B_f$ is set at the current measured blade height $B_H$. Otherwise, the controller determines at stage 604 whether the system has recently transitioned modes, that is, from the light dozing mode to the heavy dozing mode or from the heavy dozing mode to the light dozing mode.

If a transition has occurred recently, e.g., within the execution time of the process 600, then the controller re-executes stage 602, whereas if a transition has not recently occurred, then the controller returns to stage 603 to check whether the operator is commanding vertical blade movement. In this way, the blade floor may be established as a reference for later use, e.g., during the light dozing blade control process.

INDUSTRIAL APPLICABILITY

In general terms, as will be appreciated from the foregoing, the present disclosure sets forth a system and method for automatically determining a mode for blade control assistance and entering the determined mode. The disclosed examples and principles enable the user to accurately perform fine tasks while also efficiently performing productivity-oriented tasks during another cycle or another portion of the same cycle.

In an embodiment the user is able turn the automatic mode selection and switching feature on or off, whereas in an alternative embodiment the feature remains on. In a further embodiment, the feature is activated by default unless deactivated.

As noted in the main body of the specification, although a track type tractor dozer provides a convenient example herein, the disclosed principles are applicable outside of that environment as well. Noted alternative examples include applications in motorgraders and excavators. With respect to the former, a motorgrader is an earthmoving machine that may be track-driven, but is more typically wheel-driven. The motorgrader may be both articulated and wheel-steerable, and includes an under slung blade or scraper configured approximately orthogonally to the direction of machine travel. The term approximately should be understood liberally since the blade may be pivoted 45 degrees or more from orthogonal, but cuts via the forward motion of the machine.

The motorgrader blade may be raised and lowered to create different cut depths, causing varying machine loads in much the same way that blade height affects the machine load for a track type tractor dozer. Thus, in this context, application of the disclosed principles may be made in much the same way as for the track type tractor dozer. Possible variations include the use of blade pivot or tilt to affect the machine load rather than relying solely on blade height. These additional measures may be implemented with safeguards that maintain other desired parameters such as cut edge location, cut width, and so on.

With respect to application of the disclosed principles in the context of an excavator, further considerations may be accommodated, and machine speed is neglected in an embodiment. As will be appreciated, an excavator is an earthmoving machine that is largely stationary as whole during use; that is, it does not travel during use and therefore does not have a ground speed. Rather, it is installed adjacent a desired site that is within reach of its implement, in this case a bucket, and the machine as a whole remains in place while the bucket is translated and manipulated to remove or replace earth or other material from the cite.

In this context, the described principles act to limit the load imposed by the bucket, thus preventing stalling. For example, the excavator operator may command, via a joystick for example, a large bite with the bucket during rough material removal. However, if the material is more dense than expected, or if a fixed substrate such as bedrock is encountered at depth, the additional load may cause the excavator to stall.

In this case, the system automatically raises the bucket while scooping or before scooping to reduce the load to below a predetermined threshold. Operator override of the automatic load reduction may be allowed in an embodiment, e.g., by the operator exerting a large manual counteracting command. If the load limit has been set to increase machine efficiency rather than to prevent stalling, then this may allow the operator to continue. If, however, the load limit has been set to avoid stalling, then the operator may cause a stall by overriding the automatic load limit.

Given these additional examples, the foregoing examples and the following process flow should be considered in view of all possible implementations, and not just the track type tractor dozer that provides the specific context for the process example.

Returning to the track type tractor dozer as a convenient example, during use, the automatic mode selection and switching process analyzes the blade position and machine state values to determine what dozing mode the machine should be controlled in and to then perform blade control consistent with that mode. For example, in a light dozing mode, earth-moving productivity is not important, but it is desired to avoid lowering the blade below a certain value. In a heavy dozing mode, it is desirable to move as much earth as possible, that is, to efficiently remove and move material. The exact depth of the cut is not important in this mode, but efficient performance is.

Figure 7:
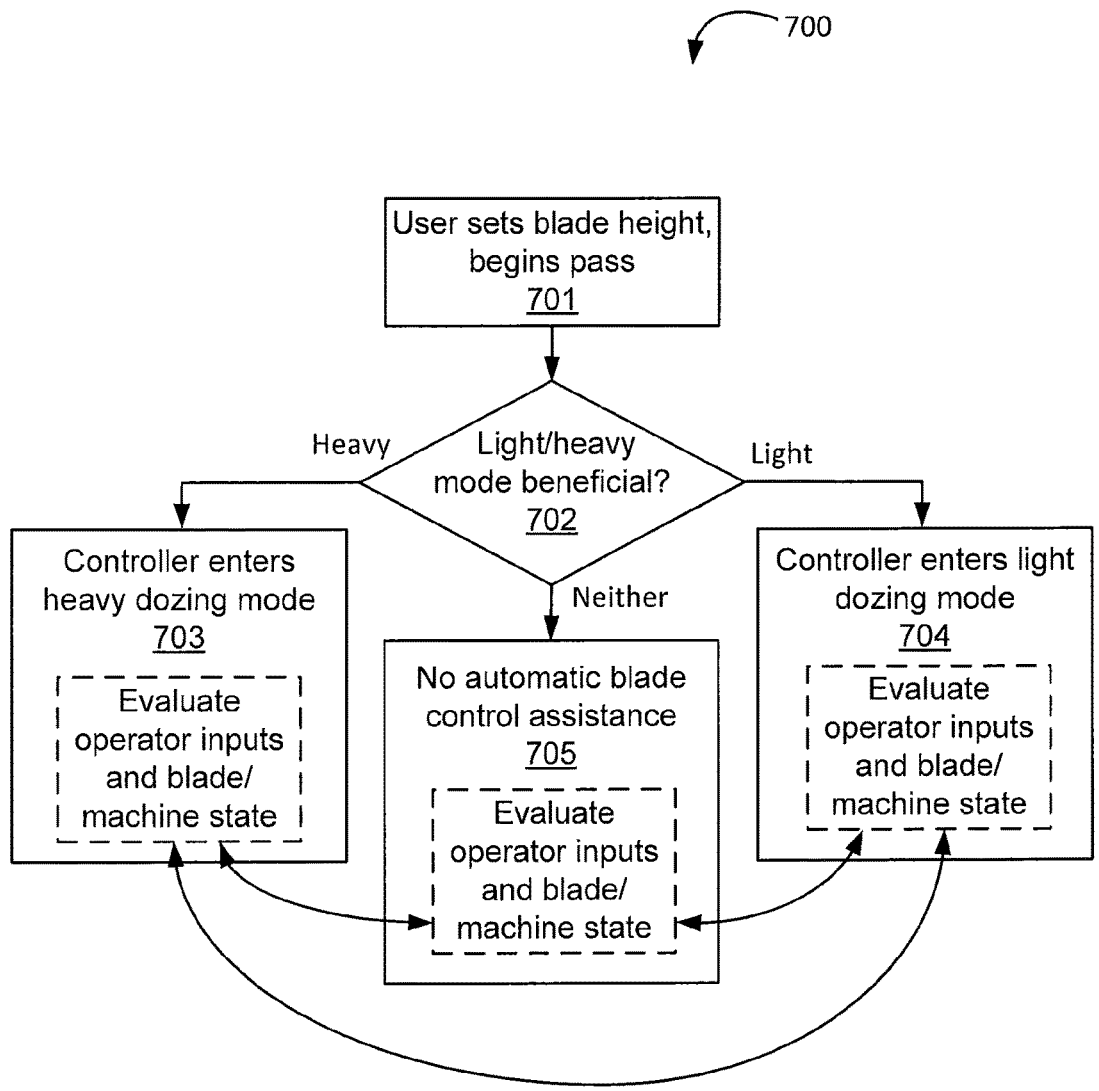
FIG. 7 is a process overview chart showing an overview of a blade control assistance process in accordance with an embodiment of the disclosed principles.

An overview of the process is shown in the process flow of FIG. 7. The process begins with the user setting a blade height and beginning a pass on a certain material, with a certain machine speed and a certain sprocket torque, yielding a certain resulting blade load. This moment is shown as stage 701 in the process 700.

At stage 702, the mode selection and switching process analyzes the blade height and machine state and determines if the blade can be beneficially controlled automatically in a light dozing mode or a heavy dozing mode. For example, as noted above, if the machine speed is below a certain speed threshold such as 1.5 mph, and the operator is providing a sufficient blade lower command, e.g., 20%, then the mode selection and switching process may enter the heavy dozing mode at stage 703.

Similarly, if the machine speed is high (e.g., higher than 1.8 mph in this example, the difference between 1.5 mph and 1.8 mph providing a hysteresis band to prevent mode hunting if speed persists in this range) or the operator is providing a sufficient blade raise command for a sufficient duration (e.g., 50% raise for at least 0.2 seconds in this example), then the mode selection and switching process may enter the light dozing mode at stage 704. In an embodiment, it is possible that neither mode is appropriate, as shown by stage 705.

From within either control mode, the controller will evaluate user inputs for override commands, and from either mode and even if no control mode was selected, the controller will periodically reevaluate the machine state to determine whether the use of the current control mode remains appropriate, switching modes as needed.

It will be appreciated that the present disclosure provides a system and method for assisting a user in executing blade control during dozing tasks. Not only do the described system and method generally enhance fine control during light dozing tasks, but they also enhance user control and machine efficiency during heavy dozing tasks. While only certain examples of the described system and method have been set forth, alternatives and modifications will be apparent to those of skill in the art given the above description. These and other alternatives are considered equivalents and within the spirit and scope of this disclosure and the appended claims.

What is claimed is:

1. A machine having an automatic blade control mode for assisting an operator of the machine, the machine comprising
    a blade affixed to a chassis, the blade being raisable and lowerable relative to the chassis, and the chassis being propelled overland by one more ground engaging elements;
    a blade actuator controlled by a blade controller, the blade controller being configured to execute computer-executable instructions read from a non-transient computer-readable medium, the instructions comprising instructions for:
    determining that automatic blade control is desired;
    determining a target operating state;
    detecting an active operator commanded blade height motion;
    detecting that the operator has commanded the blade to a first position and that the machine has a first machine operating state, resulting in a blade load corresponding to a first blade load; and
    based on detecting that the commanded blade height motion and that the machine has the first machine operating state, selecting a blade control mode from a first blade control mode and a second blade control mode,
        wherein, in the first blade control mode, the blade is manually controlled within a load limit except that the blade is automatically moved to adjust the first machine operating state when an undesirable machine operating state is detected, and
        wherein, in the second blade control mode, the blade load is controlled toward the target operating state.

2. The machine in accordance with claim 1, wherein the selected blade control mode is one of the first blade control mode or the second blade control mode, and
    wherein the blade controller is further configured to determine that conditions for the selected one of the first blade control mode and the second blade control mode are no longer met, and to thereafter switch to the other of the first blade control mode and the second blade control mode.

3. The machine in accordance with claim 2, wherein the selected blade control mode is the first blade control mode, and
    wherein the blade controller is further configured to determine that conditions are no longer met by detecting receipt of a manual blade lowering command of greater than a predetermined threshold for longer than a predetermined threshold time, and determining that a speed of the machine is less than a first machine speed threshold.

4. The machine in accordance with claim 2, wherein the selected blade control mode is the second blade control mode,
    wherein the machine operating state includes a machine speed, and
    wherein the blade controller is further configured to determine that conditions are no longer met by determining that the machine speed exceeds a second machine speed threshold.

5. The machine in accordance with claim 2, wherein the selected blade control mode is the second blade control mode, and
    wherein the blade controller is further configured to determine that conditions are no longer met by detecting receipt of a manual blade raising command of greater than a predetermined blade raising threshold for longer than a predetermined threshold time.

6. A machine work tool control system comprising:
    an operating point determiner configured to determine a target operating state of a machine based on machine data;
    an operating point adjuster configured to modify the determined machine operating point to produce a modified machine operating point based on operator input of an operator of the machine;

a controller mode determiner configured to:
  determine that automatic blade control is desired,
  detect that the operator has commanded the blade to a first position and that the machine has a first machine operating state, resulting in a blade load corresponding to a first blade load,
  based on detecting that the commanded blade height motion and that the machine has the first machine operating state, select a blade control mode from a first blade control mode and a second blade control mode,
    wherein, in the first blade control mode, the blade is manually controlled within a load limit except that the blade is automatically moved to adjust the first machine operating state when an undesirable machine operating state is detected, and
    wherein, in the second blade control mode, the blade load is controlled toward the target operating state
  provide a controller mode indicator and a work tool floor value,
    the controller mode indicator being indicative of one of the first blade control mode and the second blade control mode, and a work tool floor value; and
a work tool load controller configured to generate machine commands for work tool control assistance based on the modified machine operating point, the controller mode indicator, the work tool floor value and the machine data.

7. The machine work tool control system in accordance with claim 6, wherein the machine work tool control system is configured for use with a machine having a pitch sensor and having one or more tracks driven by one or more sprockets linked to an engine via a transmission having multiple gears, and wherein the machine data includes one or more of machine ground speed, track speed, sprocket torque, machine pitch, engine speed, or transmission gear.

8. The machine work tool control system in accordance with claim 7, wherein the machine operates in a material during a cycle and wherein the operating point determiner is further configured to determine the machine operating point by estimating properties of the material and the cycle.

9. A method comprising:
  determining, by a blade controller of a machine, that automatic blade control is desired,
    the blade controller controlling a blade actuator of the machine;
  determining, by the blade controller, a target operating state;
  detecting, by the blade controller, an active operator commanded blade height motion;
  detecting, by the blade controller, that an operator has commanded a blade of the machine to a first position and that the machine has a first machine operating state, resulting in a blade load corresponding to a first blade load,
    the blade being affixed to a chassis of the machine,
    the blade being raisable and lowerable relative to the chassis; and
  based on detecting the active operator commanded blade height motion and the first machine operating state, selecting, by the blade controller, a blade control mode, selected from a first blade control mode and a second blade control mode,
    wherein, in the first blade control mode, the blade is manually controlled within a load limit except that the blade is automatically moved to adjust the first machine operating state when an undesirable machine operating state is detected, and
    wherein, in the second blade control mode, the blade load is controlled toward the target operating state.

10. The method in accordance with claim 9, wherein the selected blade control mode is one of the first blade control mode or the second blade control mode, and
  wherein the method further comprises:
    determining that conditions for the one of the first blade control mode or the second blade control mode are no longer met; and
    switching to another one of the first blade control mode or the second blade control mode.

11. The method in accordance with claim 10, wherein the selected blade control mode is the first blade control mode, and
  wherein the method further comprises:
    determining that conditions are no longer met by detecting receipt of a manual blade lowering command of greater than a predetermined threshold for longer than a predetermined threshold time, and
    determining that a speed of the machine is less than a speed threshold.

12. The method in accordance with claim 10, wherein the selected blade control mode is the second blade control mode,
  wherein the machine operating state includes a machine speed, and
  wherein the method further comprises:
    determining that the machine speed exceeds a speed threshold, and
    determining that conditions are no longer based on determining that the machine speed exceeds the speed threshold.

13. The method in accordance with claim 10, wherein the selected blade control mode is the second blade control mode, and
  wherein the method further comprises:
    detecting receipt of a manual blade raising command of greater than a predetermined blade raising threshold for longer than a predetermined threshold time, and
    determining that conditions are no longer met based on detecting receipt of the manual blade raising command.

* * * * *